(12) United States Patent
Matsuo et al.

(10) Patent No.: US 10,427,744 B2
(45) Date of Patent: Oct. 1, 2019

(54) SADDLE TYPE VEHICLE

(71) Applicant: HONDA MOTOR CO., LTD., Minato-ku, Tokyo (JP)

(72) Inventors: Tomoya Matsuo, Wako (JP); Hikaru Tsuchihashi, Wako (JP); Hiroshi Nakashima, Wako (JP); Shinya Morooka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 15/714,184

(22) Filed: Sep. 25, 2017

(65) Prior Publication Data

US 2018/0093732 A1 Apr. 5, 2018

(30) Foreign Application Priority Data

Sep. 30, 2016 (JP) ................. 2016-194732

(51) Int. Cl.
*B62J 35/00* (2006.01)
*B60K 15/067* (2006.01)
*B62K 11/02* (2006.01)
*F16F 1/373* (2006.01)

(52) U.S. Cl.
CPC ............. *B62J 35/00* (2013.01); *B60K 15/067* (2013.01); *B62K 11/02* (2013.01); *F16F 1/3732* (2013.01)

(58) Field of Classification Search
CPC ........ B62J 35/00; B60K 15/062; B62K 11/02; F16F 1/3732
USPC ........................................................ 280/835
See application file for complete search history.

(56) References Cited

U.S. PATENT DOCUMENTS

| | | | | |
|---|---|---|---|---|
| 6,213,514 B1 * | 4/2001 | Natsume | .................. | B62J 35/00 280/833 |
| 6,237,710 B1 * | 5/2001 | Mori | ........................ | B62H 5/00 180/219 |
| 6,497,300 B2 * | 12/2002 | Mori | ........................ | B62H 5/00 180/219 |
| 6,641,169 B2 * | 11/2003 | Fukunaga | ................ | B62J 35/00 224/413 |
| 7,410,191 B2 * | 8/2008 | Karube | ..................... | B62K 5/01 180/219 |
| 7,690,689 B2 * | 4/2010 | Muroo | ..................... | B62J 35/00 280/833 |
| 10,221,593 B2 * | 3/2019 | Yamasaki | .................. | B62J 1/12 |

(Continued)

FOREIGN PATENT DOCUMENTS

| | | |
|---|---|---|
| CN | 201457589 U | 5/2010 |
| JP | 2002-362458 A | 12/2002 |
| JP | 2012-131416 A | 7/2012 |

*Primary Examiner* — Jacob D Knutson
(74) *Attorney, Agent, or Firm* — Carrier Blackman & Associates, P.C.; William D. Blackman; Joseph P. Carrier

(57) ABSTRACT

A handling performance is improved by a fuel tank fitting structure. A fuel tank is mounted to a vehicle body frame at three points: a first fixed section with a bolt and two second fixed sections with two bolts. A grommet provided in the first fixed section has an interference. Each of the second fixed sections has a fitting clearance between a collar and the grommet, and an axial clearance between the collar and the grommet. These clearances enable the grommet without an interference and the fuel tank to relatively movable to the vehicle body frame. The fuel tank and a vehicle body thus have different behaviors during cornering, thereby obtaining reduced inertial weight and light handling.

9 Claims, 5 Drawing Sheets

(56) References Cited

U.S. PATENT DOCUMENTS

| | | | |
|---|---|---|---|
| 2001/0022248 A1* | 9/2001 | Mori | B62H 5/00 180/219 |
| 2008/0156557 A1* | 7/2008 | Okamoto | B62J 17/00 180/219 |
| 2014/0035269 A1* | 2/2014 | Hagimoto | B62J 35/00 280/835 |
| 2016/0280301 A1 | 9/2016 | Inoue et al. | |
| 2018/0043770 A1* | 2/2018 | Hirano | B60K 15/07 |

* cited by examiner

SADDLE TYPE VEHICLE

The present invention relates to a saddle type vehicle such as an off-road motorcycle, and particularly relates to improvement of a handling performance by making effective use of a support structure for an energy storage section such as a fuel tank on a vehicle body frame.

BACKGROUND ART

There is known a structure that supports a fuel tank in vibration-isolated manner by fitting a grommet in a flange formed around the fuel tank, yet fitting a collar in this grommet, and fastening the fuel tank to a vehicle body frame side by a bolt penetrating this collar, as disclosed in Patent Document 1.

PRIOR ART DOCUMENT

Patent Document

[Patent Document 1]
Japanese Patent Laid-open No. 2002-362458

SUMMARY OF THE INVENTION

Problem to be Solved by the Invention

In a case of the support structure for the fuel tank as described above, even when a vehicle body greatly moves at a time of cornering or the like, the fuel tank does not move relatively to the vehicle body frame but is firmly coupled to the vehicle body frame to move integrally with the vehicle body frame.

If the fuel tank that is a heavy load is firmly coupled to the vehicle body frame as described above, the fuel tank moves in a direction of being tilted along with the vehicle body when the vehicle body is tilted leftward, rightward, or the like at a time of an initial motion of the cornering or the like. As a result, an inertial weight of the fuel tank is added to an inertial weight of the vehicle body, resulting in an increase of the inertial weight and an increase of an operation load at the time of the initial motion of the cornering.

An object of the present invention is, therefore, to realize light handling without adding an inertial weight of an energy storage section such as a heavy fuel tank to an inertial weight at a time of an initial motion of cornering.

Means for Solving the Problem

To attain the object, a saddle type vehicle according to the present invention includes: a vehicle body frame (10); a power source (11) supported on the vehicle body frame; and an energy storage section (28) that stores energy for the power source, the energy storage section (28) being fixed to the vehicle body frame (10) in a first fixed section (50) provided in a front portion of the energy storage section by a fastening member (40) and in a second fixed section (60) provided in a rear portion by a fastening member (41). The first fixed section (50) fixes the energy storage section (28) to the vehicle body frame (10) in such a manner that a relative movement of the energy storage section (28) to the vehicle body frame (10) is prohibited. The second fixed section (60) fixes the energy storage section (28) to the vehicle body frame (10) in such a manner that the relative movement of the energy storage section (28) to the vehicle body frame (10) is permitted. The second fixed section (60) includes a grommet (61) and a collar (62) inserted into the grommet. The collar (62) includes a cylindrical shaft section (64) inserted into a penetration hole (63) formed in the grommet (61). A length of the shaft section (64) is larger than a length of the penetration hole (63) and an outside diameter of the shaft section (64) is smaller than an inside diameter of the penetration hole (63). The fastening member (41) penetrates a shaft hole (64a) of the shaft section (64) and fastened to the vehicle body frame (10).

In this way, when the first fixed section (50) on the front side fixes the energy storage section to the vehicle body frame in such a manner that the relative movement of the energy storage section to the vehicle body frame is prohibited, the energy storage section is positioned and fixed to the vehicle body frame. Furthermore, when the vehicle body is tilted leftward, rightward, forward, or rearward for cornering, the energy storage section is tilted integrally with the vehicle body to follow up the vehicle body.

On the other hand, in each of the second fixed sections on the rear side, the relative movement of the energy storage section to the vehicle body frame side is permitted since the clearances are formed in an axial direction of the shaft section and an orthogonal direction to the axial direction between the grommet and the shaft section of the collar inserted into the grommet by making a length of the shaft section larger than a length of the penetration hole of the grommet and making an outside diameter of the shaft section smaller than an inside diameter of the penetration hole.

Thus, when the vehicle body is tilted leftward, rightward, forward, or rearward for cornering, the energy storage section is not tilted to follow up the vehicle body at a time of an initial motion of the cornering but moves relatively to the vehicle body frame to maintain a straight-ahead posture that is taken before start of the cornering. Owing to this, an inertial weight of the energy storage section that is heavy is not added to an inertial weight of the vehicle body at the time of the initial motion of the cornering and the inertial weight is reduced at the time of the initial motion of the cornering.

Effects of the Invention

By providing the clearances between the grommet and the collar in each of the second fixed sections on the rear side, the energy storage section can be supported on the vehicle body frame in a relatively movable manner. By doing so, when the vehicle body is tilted leftward, rightward, forward, or rearward during cornering, it is possible to set time for which the energy storage section is not interlocked with a movement of the vehicle body frame and to reduce the inertial weight at the time of the initial motion of the cornering. As a result, light handling can be achieved.

MODE FOR CARRYING OUT THE INVENTION

One embodiment applied to an off-road motorcycle that is an example of a saddle type vehicle will be described hereinafter with reference to the drawings. It is noted that each direction of up and down, left and right, and front and rear is based on a vehicle direction in the description below. Furthermore, a forward is denoted by Fr, a rearward is denoted by Rr, a leftward is denoted by L, a rightward is denoted by R, and these directions Fr, Rr, L, and R are indicated by arrows in FIG. 2.

Figure 1:
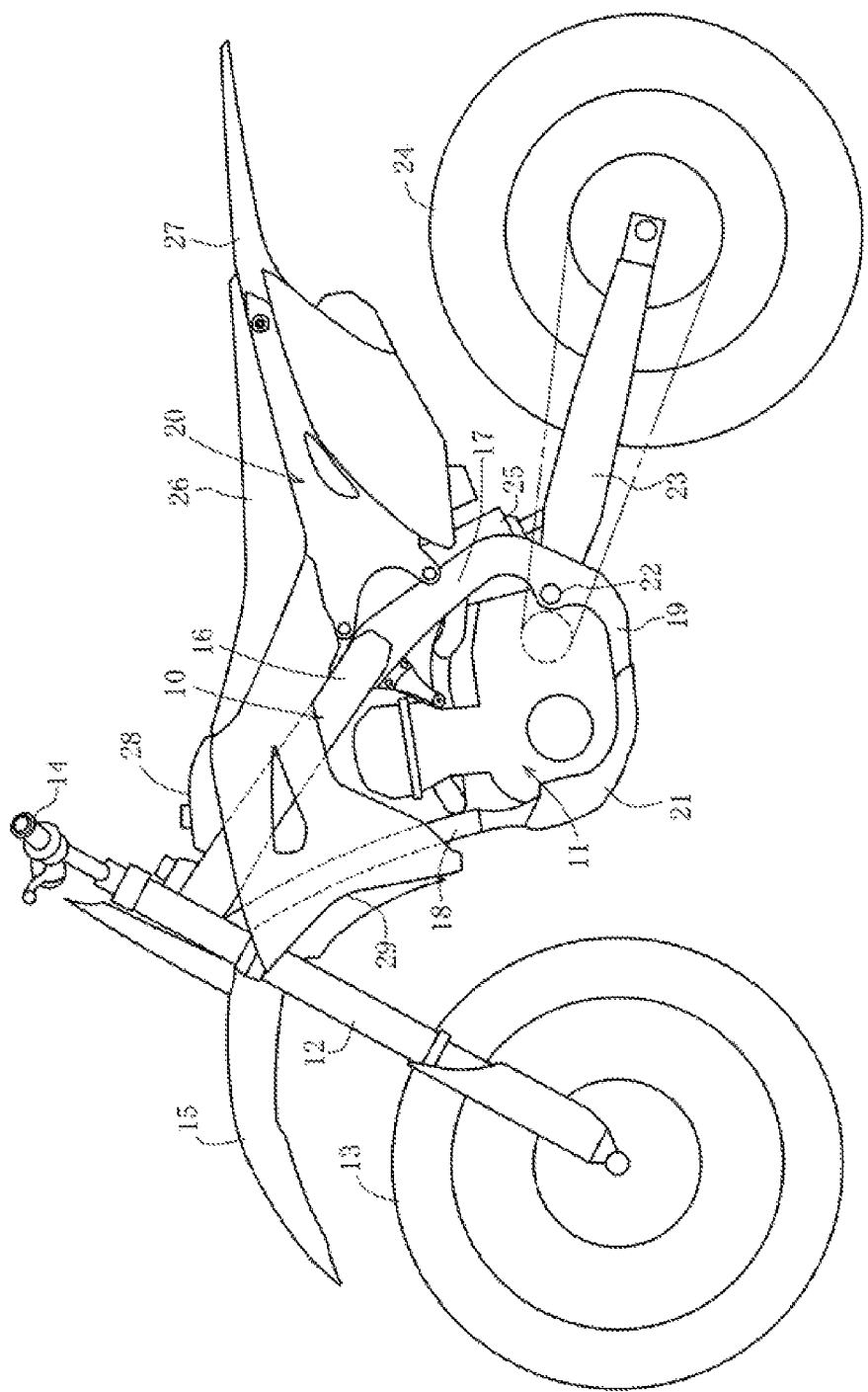
FIG. 1 is a side view of an off-road motorcycle according to an embodiment.

As depicted in FIG. 1, this motorcycle is an off-road motorcycle that has a vehicle body relatively large in a vehicle height, light in weight, and slim. The motorcycle has a configuration characteristic of an off-road vehicle such that an engine 11 is supported at a center of a vehicle body frame 10, and a mass is concentrated by disposing heavy loads at a center of the vehicle body in a compact and concentrated manner, thereby making vehicle manageability light.

A front fork 12 having a long stroke is supported in a front end portion of the vehicle body frame 10 in a rotationally movable manner. A front wheel 13 at a relatively large diameter is supported on a lower end of the front fork 12 and steered by a handlebar 14. A front fender 15 is disposed at a relatively high position above the front wheel 13 with a sufficient distance kept from the front wheel 13.

The vehicle body frame 10 has a compact configuration that has a generally triangular open loop shape long upward in a side view. The vehicle body frame 10 includes main frames 16 extending obliquely downward above the engine 11 and rearward, center frames 17 extending from rear ends of the main frames 16 downward to be curved down rearward of the engine 11, a down frame 18 extending obliquely downward in front of the engine 11 and rearward, and lower frames 19 connecting a lower end of the down frame 18 to lower ends of the center frames 17 and running below the engine 11.

A front end portion of a rear frame 20 is fastened to upper portions of the center frames 17. The rear frame 20 extends obliquely upward from the center frames 17 and rearward and serves as a part of a rear fender for a rear wheel 24 (to be described later).

An engine guard 21 is provided in a range from a lower portion of the down frame 18 to front portions of the lower frames 19. The engine guard 21 covers a range from a front portion of the engine 11 to a front-side part of a bottom portion of the engine 11 and guards the engine 11 from stepping stones and the like.

A front end of a rear arm 23 is swingably supported on the center frames 17 by a pivot 22. The rear wheel 24 is supported on a rear end of the rear arm 23. Reference character 25 denotes a rear cushion and the rear cushion 25 has a specification adapted to a large stroke of the rear wheel 24.

A seat 26 is supported on the rear frame 20. The rear frame 20 serves as a part of the rear fender and a rear-portion rear fender 27 extends long from a rear end of the rear frame 20 rearward. The rear-portion rear fender 27 as well as a part of the rear frame 20 constitutes the rear fender, is disposed at a high position in such a manner as to cover above the rear wheel 24 in a stroke range of the rear wheel 24 that swings upward and downward about the pivot 22, and enables the large stroke of the rear wheel 24.

A fuel tank 28 is disposed forward of the seat 26 and supported on the main frames 16 above the engine 11. The fuel tank 28 is a member storing fuel acting as energy of the engine 11 that is a power source, and is an example of an energy storage section according to the present invention.

Reference character 29 denotes a side cowl. This side cowl 29 is an example of an exterior component, a pair of side cowls 29 are provided leftward and rightward of the vehicle body, and a part of each side cowl 29 is positioned and supported on a side surface of the fuel tank 28.

A support structure for the fuel tank 28 will be described below with reference to FIGS. 2 to 5.

Figure 2:
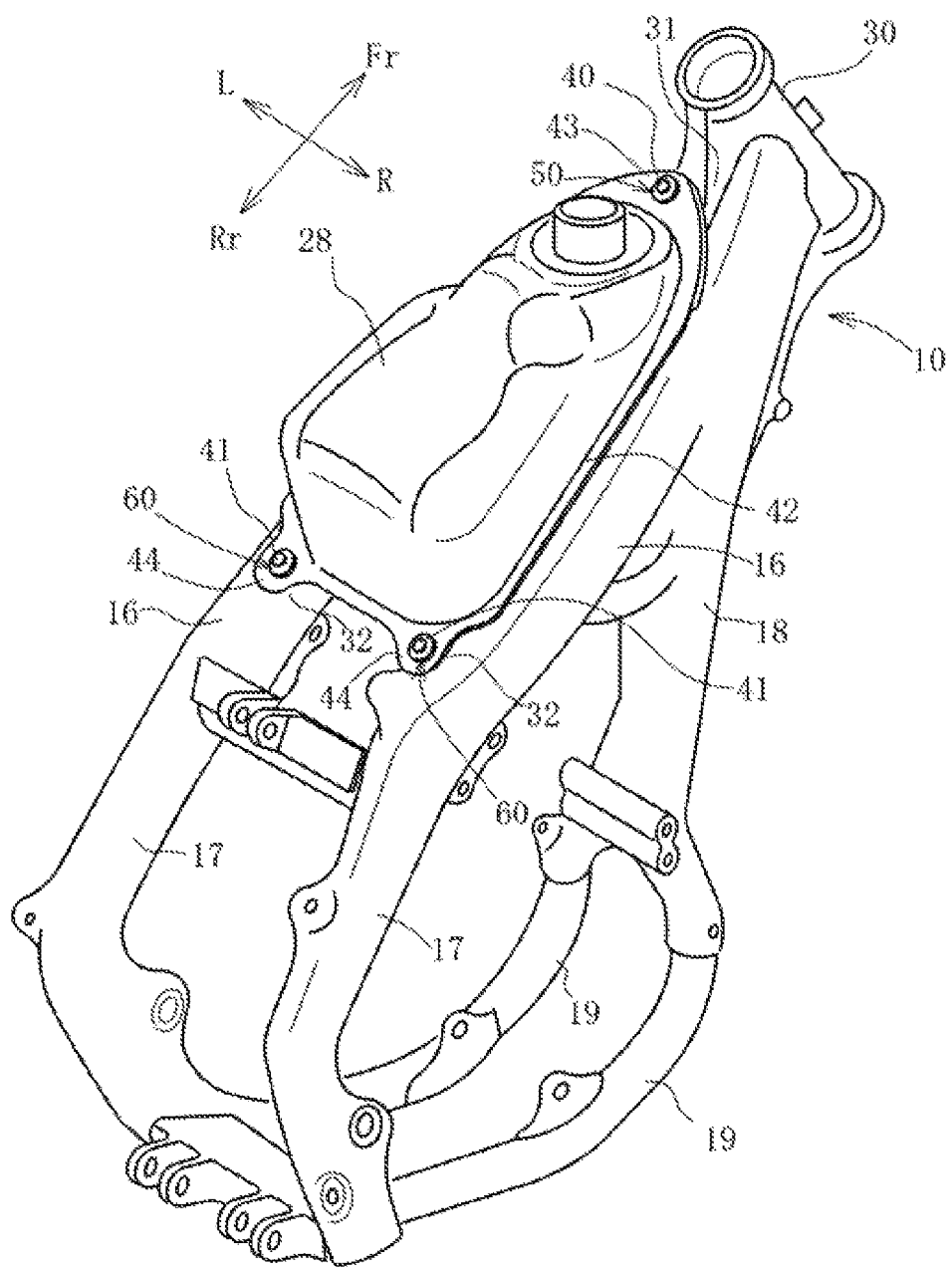
FIG. 2 is a perspective view illustrating a fuel tank support structure of the vehicle.

FIG. 2 illustrates a state in which the fuel tank 28 is supported on the vehicle body frame 10. In FIG. 2, the vehicle body frame 10 includes a head pipe 30 provided in a front end portion, the pair of left and right main frames 16 are provided to be bifurcated left and right from this head pipe 30.

The down frame 18 is provided as a unitary frame from the head pipe 30 along the center of the vehicle body, and the pair of left and right lower frames 19 are provided to be bifurcated left and right from a lower portion of the down frame 18. Likewise, the pair of left and right center frames 17 are provided to couple the main frames 16 to the lower frames 19.

Front end portions of the left and right main frames 16 are coupled together by a cross section 31.

The cross section 31 is configured from a section that is a part of the head pipe 30 and that protrudes rearward. It is noted, however, that the cross section 31 may be not a part of the head pipe 30 but may be a separate member from the head pipe 30, and may couple together the front end portions of the left and right main frames 16.

A mounting eye 32 of the fuel tank 28 is provided on an upper surface of a rear end portion of each of the left and right main frames 16. It is noted that the mounting eye 32 may be provided not in the rear end portion of each main frame 16 but in an upper end portion of each center frame 17. The mounting eye 32 may be provided in a portion near a front end portion of the seat 26 of the vehicle body frame 10.

The fuel tank 28 is mounted to the vehicle body frame 10 at three points in all, that is, a front side thereof is mounted to the vehicle body frame 10 at one point by a bolt 40, and a rear side is mounted thereto at two or left and right points by bolts 41, 41.

The fuel tank 28 has a generally triangular shape elongated in front and rear direction in a top view in such a manner as to be along a shape of the main frames 16 in the top view. A front end portion of the fuel tank 28 forms one vertex overlapping the cross section 31, while a rear portion thereof widens leftward and rightward to form two vertexes overlapping the mounting eyes 32.

A periphery of the fuel tank 28 forms a flange 42 that protrudes outward, a protruding section 43 is formed in a front end portion of this flange 42, and the fuel tank 28 is fastened to the cross section 31 by the bolt 40 in the protruding section 43. A fastening position by the bolt 40 is on a vehicle body center line (line which passes through a center of the head pipe 30 and extends in the front and rear direction in a front view, and which is not depicted). Further, the fuel tank 28 is not necessarily fastened to a part of the head pipe 30 but may be fastened to a neighborhood of the head pipe 30.

Protruding sections 44 are formed in left and right portions of the rear end portion of the flange 42, and the flange 42 is fastened to the mounting eyes 32 by the bolts 41 in the protruding sections 44. Fastening positions by the bolts 41 are bilaterally symmetric about the vehicle body center line, and a distance between the left and right bolts 41 is generally the same as that between the left and right main frames 16, so that a fastening span is relatively wide.

Fastening portions by the bolts 40 and 41 each have a vibration-isolation structure via a grommet 51 to be described later.

Figure 3A:
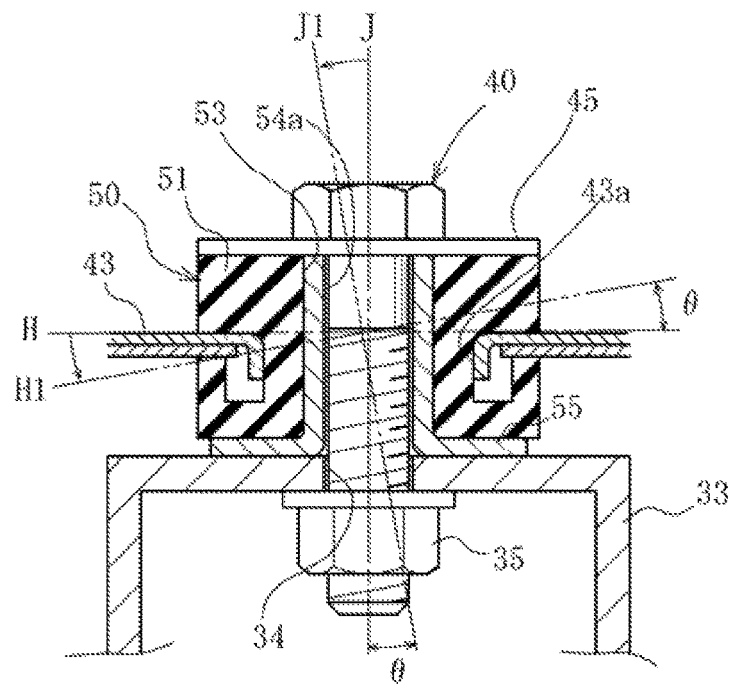
FIGS. 3A to 3D are axial cross-sectional views illustrating a front-side tank mounting section of the vehicle.
Figure 3B:
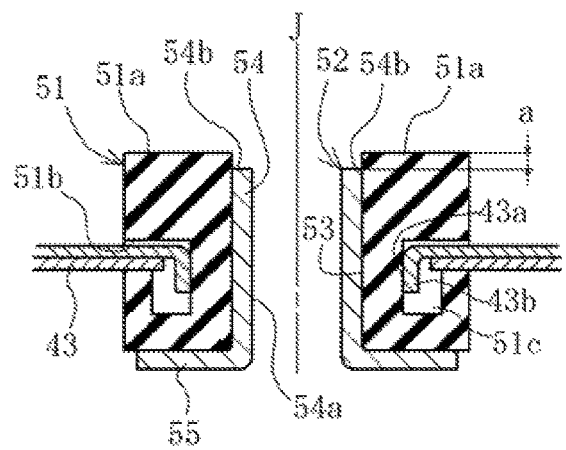
Figure 3C:
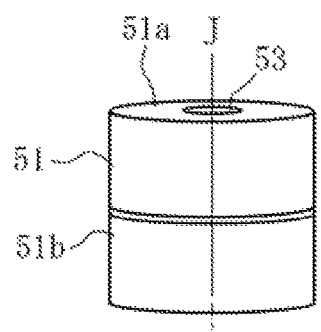
Figure 3D:
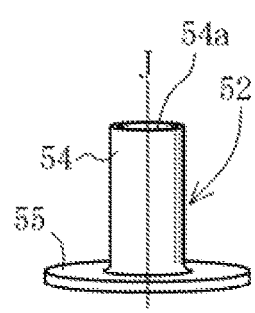

FIGS. 3A and 3B are cross-sectional views illustrating a fixed section structure on the front side of the fuel tank 28. FIG. 3A illustrates a fastened state of the bolt 40 and FIG. 3B illustrates the grommet 51 and a collar 52. In addition, FIG. 3C is a perspective view of the grommet 51 and FIG. 3D is a perspective view of the collar 52. It is noted that a fixed section on the front side will be referred to as "first fixed section 50."

In FIG. 3A, a bracket 33 having a generally U-shaped cross-section is provided in the cross section 31, a through hole 34 is provided at a center of a horizontal portion 33a of the bracket 33, and a nut 35 is welded to a rear surface of the horizontal portion 33a coaxially with this through hole 34.

The first fixed section 50 is disposed on the horizontal portion 33a. The first fixed section 50 includes the grommet 51 and the collar 52.

The grommet 51 has a cylindrical shape and a penetration hole 53 is formed in a central portion of the grommet 51. An annular slit 51b is formed in an outer circumferential portion of the grommet 51, and a surrounding portion of a mounting hole 43a formed in the protruding section 43 is externally fitted into this annular slit 51b. The annular slit 51b is continuous with an annular space 51c enlarged within the grommet 51, and a flange 43b formed in the surrounding portion of the mounting hole 43a and bent downward at a right angle is accommodated in this annular space 51c.

The collar 52 is configured with a cylindrical shaft section 54 fitted into the penetration hole 53, and a flange 55 protruding radially outward from a lower end portion of the shaft section 54 and overlapping the horizontal portion 33a. The flange 55 has a large diameter to such an extent that most of a bottom portion of the grommet 51 overlaps the flange 55.

While an outside diameter of the shaft section 54 is generally the same as an inside diameter of the penetration hole 53, the outside diameter of the shaft section 54 is slightly smaller than the inside diameter of the penetration hole 53 so that the shaft section 54 can penetrate the penetration hole 53. A shaft hole 54a is formed in the shaft section 54 to penetrate a shaft center portion of the shaft section 54. The shaft hole 54a and the through hole 34 are generally identical in a hole diameter. Therefore, when the shaft section 54 of the collar 52 is inserted into the penetration hole 53 to mate the shaft hole 54a with the through hole 34, the first fixed section 50 is disposed to be coaxial with the through hole 34.

Symbol J in FIGS. 3A to 3D denotes an axis that passes through centers of the shaft section 54 (shaft hole 54a), the grommet 51 (penetration hole 53), and the through hole 34, and a center of the bolt 40, and the centers match one another. Further, a direction along this axis J will be referred to as "axial direction" of these members.

When the bolt 40 is inserted into this shaft hole 54a and fastened to the nut 35, then the first fixed section 50 is fastened to the bracket 33, that is, a vehicle body frame 10 side, and the protruding section 43, that is, a fuel tank 28 side is supported in vibration-isolated manner on the vehicle body side via the first fixed section 50.

A large-diameter flange 45 at an outside diameter generally identical to an outside diameter of the grommet 51 is integrated with the bolt 40. Therefore, at this time, the flange 45 presses almost entirely an upper end surface 51a of the grommet 51, and the first fixed section 50 is fastened to the nut 35 while compressing the grommet 51 by a predetermined interference to be described later. It is noted that a large-diameter washer can be used as an alternative to the flange 45.

In a fastened state by this bolt 40, the first fixed section 50 and the bracket 33 are integrated with each other via the grommet 51 in a vibration-isolation manner.

In this state, since the protruding section 43 and the bracket 33 are positioned via the grommet 51 and the grommet 51 is elastically deformed by a vibration of the vehicle body, vibration transmission between the protruding section 43 and the bracket 33 is prevented. However, a greater relative movement of the protruding section 43 to the bracket 33 is restricted during the vibration. Therefore, the relative movement of the protruding section 43 to the bracket 33 is restricted in the axial direction of the bolt 40, an orthogonal direction to the axial direction, and an intersection direction and the protruding section 43 moves integrally with a movement of the vehicle body side (bracket 33 side) when the vehicle body is tilted.

Restriction of the relative movement means as follows in the present application. While a slight relative movement approximately corresponding to a vibration amplitude of a vibration-isolation target is permitted in vibration-isolation support that is a subjective function of the grommet 51, a greater movement than the slight relative movement, for example, a relative movement that may correspond to a variation in a posture of the vehicle body when, for example, the vehicle body is tilted at a time of an initial motion of cornering is restricted.

As depicted in FIG. 3B, in a state before the bolt 40 is fastened in the first fixed section 50, the upper end surface 51a of the grommet 51 protrudes upward of an upper end portion 54b of the shaft section 54 by as much as a predetermined dimension a, and this predetermined dimension a is the interference. Furthermore, a slight clearance is formed between an upper portion side of the annular slit 51b and an upper surface of the protruding section 43.

When the bolt 40 is fastened, then the flange 45 compresses the grommet 51 by as much as the interference that is the predetermined dimension a to abut on the upper end portion 54b, and an inner circumferential surface of the penetration hole 53 of the grommet 51 is closely attached to an outer circumference of the shaft section 54. Furthermore, the annular slit 51b is collapsed, the slight clearance initially present between the upper portion side of the annular slit 51b and the upper surface of the protruding section 43 is eliminated, and the grommet 51 is closely attached to the upper surface of the protruding section 43 (refer to FIG. 3A).

This interference allows the grommet 51 to be closely attached to the protruding section 43 and the collar 52, thus prohibiting movements of the protruding section 43 and the collar 52 relative to each other. The interference can be freely set.

Figure 4A:
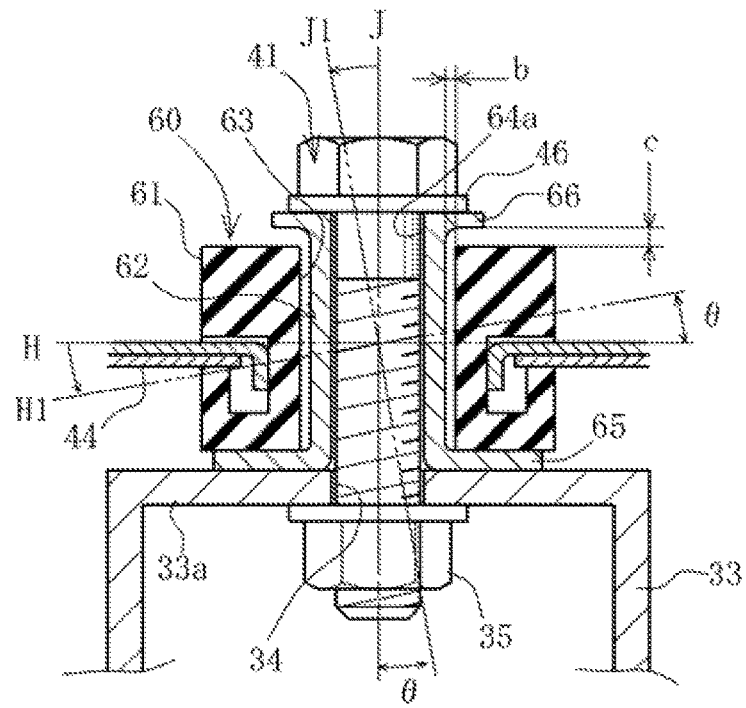
FIGS. 4A and 4B are axial cross-sectional views illustrating one side of rear-side tank mounting sections of the vehicle.
Figure 4B:
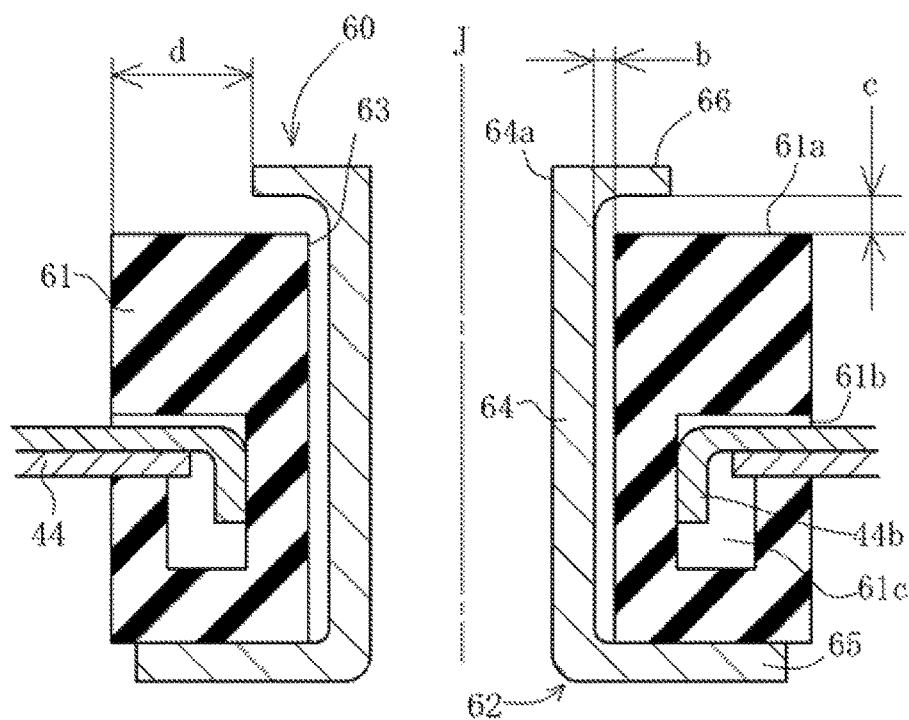

FIGS. 4A and 4B illustrate a fastening structure on the rear side by the bolt 41. FIGS. 4A and 4B are enlarged cross-sectional views illustrating a fastened state of a grommet 61 and a state before the grommet 61 is fastened, respectively. The left and right fastening structures are the same.

It is noted that a fixed section on the rear side will be referred to as "second fixed section 60."

In FIG. 4A, a generally U-shaped bracket 33 is provided on the mounting eye 32. A structure of this bracket 33 is the same as that depicted in FIG. 3A and denoted by the same reference character. The same thing is true for the axis J.

The bolts 40 and 41 are similarly disposed along the axis J and central axes thereof match J1.

The second fixed section 60 is disposed on this bracket 33 to be coaxial with the through hole 34. The second fixed section 60 includes the grommet 61 and a collar 62. The grommet 61 is similar to the grommet 51 of FIGS. 3A and 3B and has a penetration hole 63 formed at a center thereof. An annular slit 61b is formed in an outer circumferential portion of the grommet 61, and a through hole 44a of the protruding section 44 is external fitted into this annular slit 61b. Reference character 61c denotes an annular space and 44b denotes a flange.

Figure 5:
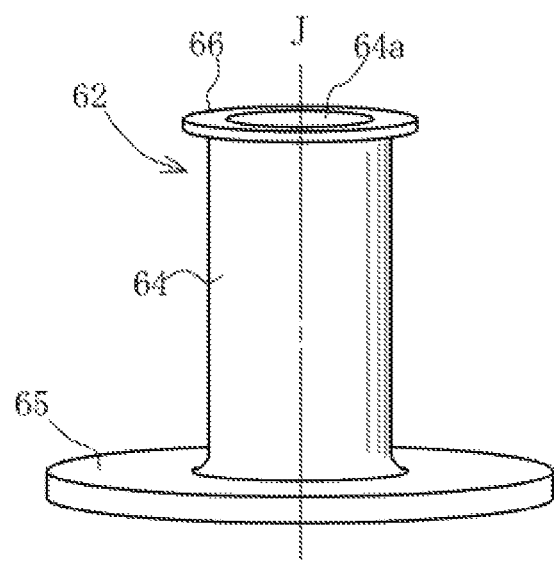
FIG. 5 is a perspective view of a collar used in a grommet of the rear-side tank mounting section.

As depicted in FIG. 5 that is a perspective view, the collar 62 integrally includes a cylindrical shaft section 64, a large-diameter flange 65 provided on a lower end of the shaft section 64, and a small-diameter flange 66 provided in an upper end portion of the shaft section 64. The large-diameter flange 65 is generally the same in diameter as the flange 55 of FIGS. 3A, 3B, and 3D, placed on the horizontal portion 33a of the bracket 33, and has a magnitude to such an extent that most of a bottom portion of the grommet 61 overlaps the flange 65.

As depicted in FIG. 4B, the shaft section 64 has an outside diameter slightly smaller than an inside diameter of the penetration hole 63 of the grommet 61, thus forming a predetermined fitting clearance b. Furthermore, a length the shaft section 64 is larger than an axial length of the grommet 61, and the small-diameter flange 66 protrudes upward of an upper end surface 61a of the grommet 61 to form a predetermined axial clearance c.

These clearances b and c are set arbitrarily but preferably equal to or smaller than 1 mm.

An outside diameter of the small-diameter flange 66 of the collar 62 is slightly larger than the inside diameter of the penetration hole 63 of the grommet 61 and smaller than an outside diameter of the grommet 61.

The small-diameter flange 66 may have the outside diameter to such an extent that the small-diameter flange 66 is easy to insert into the penetration hole 63 when the shaft section 64 of the collar 62 penetrates the penetration hole 63, and that the small-diameter flange 66 overlaps the upper end surface 61a upward to act as a release stopper and a small-diameter flange 46 formed on the bolt 41 can overlap the small-diameter flange 66 when the shaft section 64 of the collar 62 protrudes upward from the penetration hole 63.

An outside diameter of the small-diameter flange 46 is generally the same as or slightly smaller than the outside diameter of the small-diameter flange 66. Therefore, a dimensional difference d between the outside diameter of the grommet 61 and the outside diameter of the small-diameter flange 66 is relatively large.

Referring back to FIG. 4A, the second fixed section 60 is disposed on the horizontal portion 33a to be coaxial with the axis J of the through hole 34, and integrated with the bracket 33 by inserting the bolt 41 into the shaft hole 64a of the shaft section 64 from above and fastening the bolt 41 to the nut 35.

At this time, the small-diameter flange 46 integrally provided on the bolt 41 abuts on and presses the small-diameter flange 66. However, since the axial clearance c is present between the small-diameter flange 66 and the upper end surface 61a of the grommet 61, the grommet 61 is not compressed by the small-diameter flange 46 of the bolt 41 and the fitting clearance b and the axial clearance c are maintained in a predetermined degree. The annular slit 61b is not collapsed, and an upper portion side of the annular slit 61b is not closely attached to the protruding section 44 but is kept in a state in which a slight clearance is present between the upper portion side of the annular slit 61b and an upper surface of the protruding section 44 (refer to FIGS. 4A and 4B).

Functions and effects of the present embodiment will next be described.

The fuel tank 28 is supported in vibration-isolated manner on the vehicle body frame 10 at the three points, that is, the front portion by the bolt 40 and the left and right rear portions by the bolts 41. At this time, when the vehicle body is tilted during cornering or the like, different behaviors are generated between the fixed sections on the front and rear portions at a time of the initial motion of the cornering.

First, as depicted in FIG. 3A, in the first fixed section 50 on the front side, the relative movement to be equal to or more than a predetermined movement of the protruding section 43 to the bracket 33 is restricted in the axial direction of the bolt 40, the orthogonal direction to the axial direction, and the intersection direction. Owing to this, the front end portion of the fuel tank 28 moves integrally with the vehicle body frame 10, that is, the vehicle body side, and is tilted along with the vehicle body during cornering.

This behavior will be described in more detail. Referring to FIG. 3A, when the vehicle body is tilted at an angle of θ with respect to the axis J, the axis J changes to J1. When the fuel tank 28 is tilted integrally with the vehicle body frame 10, the upper surface of the protruding section 43, which has been initially denoted by H orthogonal to the axis J, changes to H1 tilted at θ with respect to H.

On the other hand, in each of the second fixed sections 60 on the rear side, the relative movement of the protruding section 44 to the bracket 33 is permitted in the axial direction of the bolt 41, and the orthogonal direction to the axial direction as well as a tilting direction intersecting the axis because of the presence of the fitting clearance b and the axial clearance c.

In other words, when the vehicle body is tilted at θ with respect to the axis J and the axis changes to J1, the fuel tank 28 is tilted relatively to the vehicle body to maintain a horizontal posture by inertia of straight ahead travelling at the time of the initial motion of cornering since the fuel tank 28 is a relatively heavy load and the fitting clearance b and the axial clearance c are present.

Therefore, the upper surface of the protruding section 44 is kept H without changing to H1 tilted at θ with respect to H, and this state indicates that the protruding section 44 moves relatively at θ in an opposite direction to tilting of the vehicle body.

Owing to this, the fuel tank 28 is kept horizontal, and then tilted to follow up the tilting of the vehicle body frame 10, that is, the vehicle body with a slight delay.

As a result, the inertial weight involved at the time of the initial motion of cornering is only the inertial weight of the vehicle body without adding thereto the inertial weight of the fuel tank 28. Therefore, the inertial weight at the time of the initial motion of cornering is reduced, thereby making light handling possible and quick cornering possible.

Moreover, by setting each of the fitting clearance b and the axial clearance c to be equal to or smaller than a predetermined value, a moving amount of the fuel tank 28 can be restricted. Setting each of the fitting clearance b and the axial clearance c to, in particular, equal to or smaller than 1 mm is the most favorable clearance setting since the setting can make contributions to improving the handling performance with hardly generating mounting backlash during normal travelling.

Furthermore, the first fixed section 50 on the front side is positioned and fixed to the vehicle body side by the bolt 40 because of the presence of the interference. Owing to this, when exterior components (for example, the side cowls 29) are mounted to the vehicle body, a part of the exterior components is mounted to the fuel tank 28, whereby the part of the exterior components can be positioned and the entire exterior components can be accurately mounted while being positioned relatively to the fuel tank 28.

Furthermore, the second fixed sections 60 are disposed in the neighborhood of the seat 26. Owing to this, if the neighborhood of the seat 26 is supported in a relatively movable manner, then the fuel tank 28 that is the heavy load moves relatively to the vehicle body frame 10 near a rider (not depicted), and handleability is not disturbed.

Moreover, the rear portion of the fuel tank 28 is fixed to one portion of each of the left and right main frames 16 disposed at the distance kept therebetween, and the span between the left and right fixed sections is wide. Owing to this, when the vehicle body is tilted, one side (tilted side) of the left and right second fixed sections 60 has a greater amount of the relative movement; however, it is possible to sufficiently cope with such a relative movement.

Furthermore, the second fixed sections 60 fixed to the left and right main frames 16 are configured such that the bolt 41 fastened to each main frame 16 side and the protruding section 44 on the rear end portion side of the fuel tank 28 are relatively movable because of the presence of the fitting clearance b and the axial clearance c, so that the rear end portion of the fuel tank 28 does not firmly couple the left and right main frames 16. As a result, the main frames 16 (vehicle body frame 10) can be made resilient during cornering and the like and it is possible to ensure excellent resilience of the main frames 16.

Moreover, in each of the second fixed sections 60, the collar 62 includes the large-diameter flange 65 and the small-diameter flange 66. Due to this, fastening of the grommet 61 can be restricted by causing the small-diameter flange 66 to receive the small-diameter flange 46 of the fastening bolt 41 while the large-diameter flange 65 prevents the bottom surface of the grommet 61 from directly abutting on the main frame 16 to maintain durability.

Furthermore, configuring the upper end side of the collar 62 as the small-diameter flange 66 facilitates releasing the grommet 61 at a time of maintenance, and facilitates handling the grommet 61 and the collar 62 integrally since the small-diameter flange 66 acts as the release stopper.

The present invention is not limited to the embodiment stated above and various modifications and applications are possible within the scope of the invention. For example, if one main frame is provided along the center of the vehicle body in the front and rear direction, the fuel tank 28 may be fixed onto this main frame in one portion of the main frame on each of front and rear sides thereof. In this case, the first fixed section 50 without the interference is used on the front side while the second fixed section 60 without the interference is used on the rear side. Even with such a configuration, it is possible to reduce the inertial weight at the time of the initial motion of tilting with respect the tilting of the vehicle body leftward, rightward, forward, or rearward such as the time of the initial motion of cornering.

Furthermore, the brackets 33 depicted in FIGS. 3A and 4A may be omitted and nut sections may be directly provided on the cross section 31 and the mounting eyes 32 of the vehicle body frame 10.

Moreover, a battery (not depicted) may be used as the energy storage section as an alternative to the fuel tank 28. Particularly if an electric motor is used as the power source as an alternative to the engine 11, the battery supplying electric power that is the energy to this electric motor has a high capacity and a heavy weight. Therefore, applying the present application to the support structure for this large-sized battery can produce a greater effect.

Furthermore, the vehicle to which the present invention is applied is not limited to the off-road vehicle but saddle type vehicles of various uses such as an on-road motorcycle are applicable.

What is claimed is:

1. A vehicle comprising:
   a vehicle body frame;
   a power source supported on the vehicle body frame; and
   an energy storage section that stores energy for the power source, the energy storage section being fixed to the vehicle body frame in a first fixed section provided in a front portion of the energy storage section by a first fastening member and in a second fixed section provided in a rear portion by a second fastening member, wherein:
   the first fixed section fixes the energy storage section to the vehicle body frame in such a manner that a relative movement of the energy storage section in relation to the vehicle body frame is prohibited,
   the second fixed section fixes the energy storage section to the vehicle body frame in such a manner that the relative movement of the energy storage section in relation to the vehicle body frame is permitted,
   the second fixed section includes a grommet and a collar inserted into the grommet,
   the collar includes a cylindrical shaft section inserted into a penetration hole formed in the grommet,
   a length of the shaft section is larger than a length of the penetration hole and an outside diameter of the shaft section is smaller than an inside diameter of the penetration hole, and
   the second fastening member penetrates a shaft hole of the shaft section and is fastened to the vehicle body frame.

2. The vehicle according to claim 1, wherein:
   the first fixed section includes a grommet and a collar inserted into the grommet,
   the collar includes a cylindrical shaft section inserted into a penetration hole formed in the grommet,
   a length of the shaft section is smaller than a length of the penetration hole, and
   the grommet includes an interference such that an upper portion of the grommet protrudes upward of an upper end of the shaft section.

3. The vehicle according to claim 2, wherein:
   the collar of the second fixed section includes a large-diameter flange provided in a bottom portion of the shaft section and a small-diameter flange provided in an upper portion of the shaft section.

4. The vehicle according to claim 3, wherein:
   the second fixed section includes a clearance between the inside diameter of the penetration hole of the grommet and the outside diameter of the shaft section of the collar, the clearance being equal to or smaller than 1 mm, and
   the second fixed section includes a clearance between an upper end surface of the penetration hole and the small-diameter flange, the clearance being equal to or smaller than 1 mm.

5. The vehicle according to claim 1, wherein:
   the vehicle body frame includes a head pipe provided in a front end portion and a pair of left and right main frames extending rearward from the head pipe, the first fixed section is provided in one portion on a front side of the energy storage section, and fixed to a neighborhood of the head pipe, and the second fixed section is provided in each of left and right portions on a rear side of the energy storage section, and fixed to an upper surface of the corresponding one of the pair of left and right main frames.

6. The vehicle according to claim 5, wherein:

the collar of the second fixed section includes a large-diameter flange provided in a bottom portion of the shaft section and a small-diameter flange provided in an upper portion of the shaft section.

7. The vehicle according to claim 6, wherein:

the second fixed section includes a clearance between the inside diameter of the penetration hole of the grommet and the outside diameter of the shaft section of the collar, the clearance being equal to or smaller than 1 mm, and the second fixed section includes a clearance between an upper end surface of the penetration hole and the small-diameter flange the clearance being equal to or smaller than 1 mm.

8. The vehicle according to claim 1, wherein:

the collar of the second fixed section includes a large-diameter flange provided in a bottom portion of the shaft section and a small-diameter flange provided in an upper portion of the shaft section.

9. The vehicle according to claim 8, wherein:

the second fixed section includes a clearance between the inside diameter of the penetration hole of the grommet and the outside diameter of the shaft section of the collar, the clearance being equal to or smaller than 1 mm, and the second fixed section includes a clearance between an upper end surface of the penetration hole and the small-diameter flange, the clearance being equal to or smaller than 1 mm.

* * * * *